J. L. BAYLEY.
WAGON-BRAKE.
No. 174,183. Patented Feb. 29, 1876.
Fig: 1. 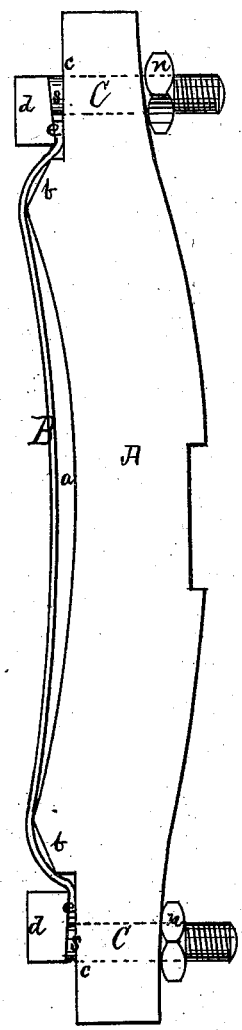
Fig: 2. 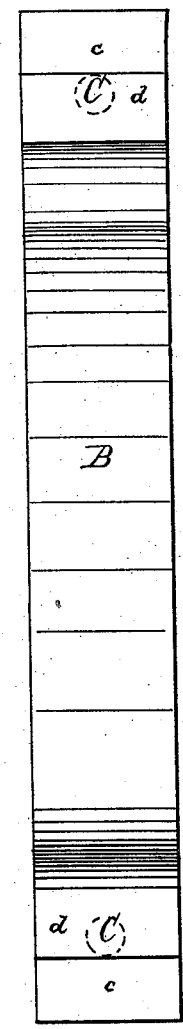
Witnesses:
Henry Eichling
B. S. Clark
Inventor:
James L. Bayley.
By Fitch & Fitch
His Attys.

UNITED STATES PATENT OFFICE.

JAMES L. BAYLEY, OF ROCK RAPIDS, IOWA.

IMPROVEMENT IN WAGON-BRAKES.

Specification forming part of Letters Patent No. 174,183, dated February 29, 1876; application filed September 21, 1875.

*To all whom it may concern:*

Be it known that I, JAMES L. BAYLEY, of Rock Rapids, Lyon county, State of Iowa, have invented an Improved Brake-Block for Wagons, of which the following is a specification:

My invention consists in the combination, with the brake-block having the form hereinafter shown, of a clamp-bolt of the construction hereinafter particularly described, whereby the weaving-pad or facing of the brake-block may be readily and conveniently secured to the face of said block without the use of nails or screws.

Figure 1 is a side elevation of my brake-block, and Fig. 2 is a front elevation of the same.

Hitherto it has been customary to secure the wearing-pad of the brake-block of a wagon-brake to said block by nailing or screwing it at its ends to the wood of the block; but by this method the pad or facing is weakened, and is liable to pull off when bearing against the wheel, and to tear away from the heads of the nails or screws.

The object of my invention is to obviate these difficulties.

A is the brake-block, usually constructed of wood, which I form with the concave bearing-face $a$, and the shoulders $b$ at each end thereof, and the flat extremities $c$, as shown. Across the face $a$, lengthwise, I place the wearing-pad or facing B, which is, preferably, made of stout leather cut the same width as the face of the block. The ends of the facing B pass over the shoulders $b$ and rest upon the flat extremities $c$, as shown, to which they are tightly clamped by the clamp-bolts C. The said clamp-bolts C are formed with a broad head, $d$, extending across the facing B, its whole width, and projecting beyond the body or shank of the bolt on one side only, over the ends of the facing B, and with the under face $e$ of said broad projecting head $d$ at an angle downward from the body or shank $s$, as shown. When the bolt is clamped down tightly to the block on the ends $c$ by the nuts $n$, as shown, the under outer edges of the projecting broad heads $d$ will press tightly against the ends of the facing B across the entire width of said facing, and operate to hold the said facing securely in place upon the block A.

It is evident that, by means of this fastening, the liability of the facing (when fastened by nails or screws passing through its ends) to tear away from the block under the strain of the wheel is entirely obviated.

The facing is not pierced or weakened, but the strain upon the ends of the facing is evenly distributed across its surface.

It is also evident that a worn-out facing may be readily removed and a new one placed upon the block.

What I claim as my invention, and desire to secure by Letters Patent, is—

The combination, in a brake-block for wagons, of the block A, having the concave bearing-face $a$, shoulders $b$, and flat ends $c$, the facing B, and the clamp-bolts C, having the broad projecting-head $d$, with its under face $e$, and the nut $n$, as described.

JAMES L. BAYLEY.

Witnesses:
KEMP PENMAN,
REUBEN CLARK.